Patented Apr. 25, 1950

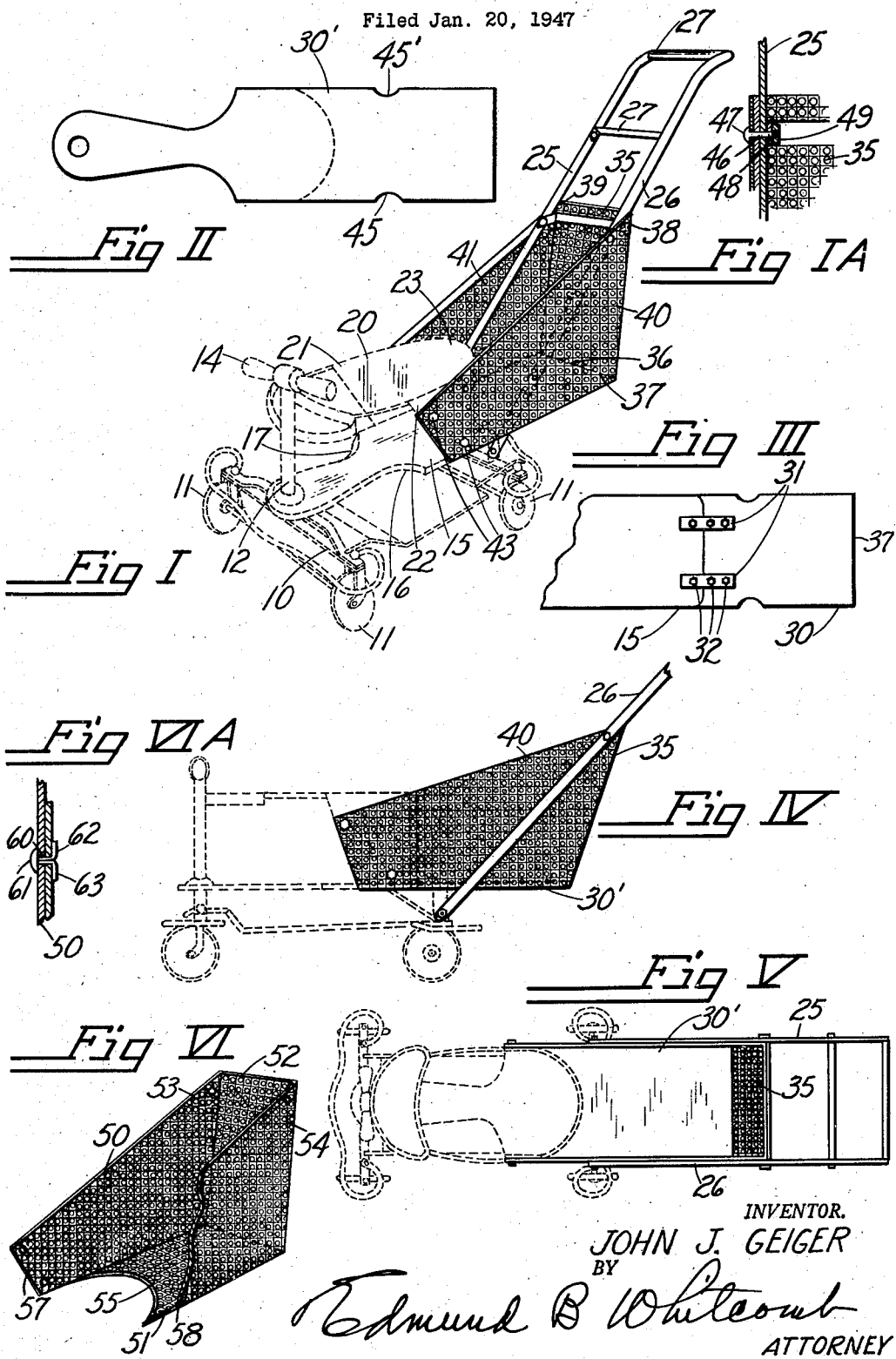

2,505,323

UNITED STATES PATENT OFFICE 2,505,323

COMBINED BABY COACH, BABY WALKER, AND PARCEL CARRIER

John J. Geiger, Toledo, Ohio

Application January 20, 1947, Serial No. 723,046

1 Claim. (Cl. 224—42.43)

This invention relates to a combined attachable and removable extension and parcel compartment for a baby coach and walker as well as a unified complete parcel carrier and baby coach and walker.

One of the objects of my invention is to provide a simplified base extension and parcel receiver which may be readily attached to existing baby coaches and baby walker and the like. Moreover by my invention I contemplate supplying a unitary parcel compartment member to be sold as a unit having a base, side walls, and rear complete in itself and suitably constructed to fit any type of child vehicle and which may be so arranged, as to enable any person to easily attach the same, and if occasion arises, to remove it and restore the baby coach to its original condition.

Another object is to provide a simple construction of base, side walls, and attaching means as to produce an effect of a combined unit of parcel carrier and coach as if the same were so constructed in the first instance; to the unique way in which the sides of the parcel carrier are enjoined with the baby vehicle proper and the use of the pushing handle as the means for supporting the parcel extension compartment.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure I is a perspective view of my combined baby coach, baby walker, and parcel carrier;

Figure I—A is a detail of a removable fastening means for securing the parcel carrier to the child's vehicle.

Figure II is a detail of one type of floor base construction therefor;

Figure III illustrates the attachable and detachable base for the parcel carrier;

Figure IV is a side elevational view showing the combined baby coach and parcel carrier with an integral floor base such as the one illustrated in Figure II with the handles located on the outside of the carrier in Figure IV; while Figure V is a top plan view of the construction illustrated in Figure IV;

Figure VI is a perspective view of another embodiment of my invention in which the detachable, self-contained parcel carrier is shown as a unit to be applied or removed from the child's vehicle as desired.

Figure VI—A is a detail of a removable fastening means which may be employed.

Referring to Figure I, it will be seen that the child's vehicle has a bottom chassis 10 mounted on four wheels 11, the front pair of which may be steerable by an upright steering column 12 with a grab handle and steering piece 14, as shown. The bottom or seat for the child is illustrated at 15 and is cut away as indicated at 16 and 17 so the child's legs can extend downwardly and, if desired, rest on the platform of the chassis 10. The seat 15 may be in the form of a wooden straddle seat or base board, and the child's compartment also has, in one embodiment of my invention, the body supporting portion 20 having side walls 21 and 22 and a curved back 23.

Extending upwardly and rearwardly from the chassis 10, are the pushing handle members 25 and 26 joined at various points and at the top by cross bars 27, all of which construction may be changed as is found expedient.

As illustrating one embodiment of my attachable and detachable carrier compartment, I illustrate in Figure III a wooden base extension 30 which is connected to the straddle board 15 by a pair of metal or wooden straps 31, which may be screwed as indicated at 32 into the extension 30 and the base 15. I also provide a similar pair of connecting straps on the underneath side of extension 30 to securely connect the same with the base 15.

To form the rear side of the parcel carrier, as illustrated in Figure I, I provide a metal mesh constuction 35 connected at its lower edge 36 to the rear edge 37 of the extension 30. The top corners 38 and 39 of the rear section 35 are connected to the handle members 25 and 26 by removable screws and bolts, as indicated.

The two side walls of my parcel compartment, in the particular embodiment in my invention, which I have illustrated in Figure I, consist of a pair of similarly shaped metal mesh members 40 and 41 connected at their lower edges to the side walls of the extension 30 and straddle board 15. The rear vertical edges of the sides 40 and 41 are connected to the opposite sides of the rear wall 35 as indicated. The front edges of the sides 40 and 41 are removably bolted by bolts 43 in the part illustrated to the sides of the body 30 of the child's vehicle.

Of course, many variations of my construction can be readily employed, and the parcel carrier can have the three side walls constructed integrally, and instead of overlapping at the front edges of the sides 40 and 41 with the rear portion of the side walls of the baby compartment, these side walls 40 and 41 may be connected on vertical edges directly to the rear portion of the child's body support.

In the embodiment of my invention illustrated in Figures IV and V, the entire combination of baby vehicle and parcel carrier is originally made as a unit to be sold as such, and in this instance the base portion in the particular illustration of Figure IV is made of a single piece of wood 30' such as that illustrated in Figure II. Again, the side members 25 and 26 of the handle may be located either inside or outside of the parcel compartment, and if located outside as in Figure IV, the notches shown at 45 and 45' of the floor base 30' (Figure II) are not needed, although it is to be understood that when the handle members 25 and 26 are inside these notches 45 and 45' form a space for the same in the assembled vehicle. In Figure IV the metal mesh for the parcel compartment is similar to that shown in Figure I, having the rear wall 35 and side walls 40 and 41 as in Figure I. Moreover, instead of using the wooden base 30', shown in Figure IV, with these metal side walls and back construction for the parcel compartment, I also use a unitary metal compartment such as that illustrated in Figure VI and hereinafter more particularly described as a further arrangement of my construction of combined baby carriage and parcel carrier of the type illustrated in Figure IV, in which the unitary parcel compartment is permanently fixed to the vehicle.

Many forms of means for attaching my parcel carrier to the vehicle may be employed, and I have illustrated in Figure I—A, a small bolt 46 having a head 47 and shank 48, the shank 48 passing through the meshes of the parcel carrier and also through suitable openings in the other parts of the vehicle where the attachment is made. A nut 49 is used to clamp the parts in position, and the same may be readily removed, if it is desired to take the parcel compartment off the vehicle. Many forms of detachable connecting means may be employed.

In Figure VI, I show a still further embodiment of my invention in which the entire parcel carrier is made as a unit 50 from the metal mesh material and shaped as shown with the bottom part 51, rear end 52, and side walls 53 and 54. In the particular embodiment here shown, I have made the parcel carrier 50 of a shape to fit the particular child's vehicle, illustrated in Figures I and IV, and, to that end provide a cut away portion in the base as indicated at 55, and the sides extend upwardly to be attached to the body of the vehicle, as illustrated at 57 and 58. I also make the parcel carrier 50 illustrated in Figure VI of various shapes to fit various child's vehicles, and I have illustrated in Figure VI—A another type of fastening means in which I use a double pronged staple 60 having a head 61 and two prongs 62 and 63 adapted to be inserted through the parcel carrier 50 at such points as is necessary to securely retain the same in position on the vehicle whereby the prongs 62 and 63 of the staple 60 may be readily bent around the adjacent parts of the vehicle or the frame thereof or suitable handle portions to securely retain the parcel carrier 50 in place. If it should be desired to remove the carrier 50, the two prongs of the staple may be rebent and the staple easily removed. I use a type of metal of suitable alloy so that it may be bent into place. Moreover, the bolt and nut arrangement of Figure I—A can also be employed.

It is apparent that, within the scope of the invention, modifications and different arrangements may be made other than is herein disclosed, and the present disclosure is illustrative merely, the invention comprehending all variations thereof.

What I claim is:

In a child's vehicle having a wheeled child compartment and a rearwardly and upwardly extending handle therefore formed of two spaced rods, the combination therewith of a parcel compartment comprising a base forming an extension of the vehicle bottom; a rear sheet metal wall extending upwardly from the rear edge of said extension to said handle members, the lower edge of said parcel compartment rear wall being connected to said bottom extension of the vehicle; a pair of side sheet metal wall members connected to said rear wall for said parcel compartment, said side members connected at their lower edges to the opposite edges of said parcel compartment base extension; said walls connected at their front vertical edges to the rear portion of the side walls of the child compartment; and means to connect the side walls of said parcel compartment to said rods forming the vehicle handle adjacent the connection of said rear parcel compartment to said parcel compartment side walls.

JOHN J. GEIGER.

REFERENCES CITED

The following references are of record in the file of this patent:

UNITED STATES PATENTS

| Number | Name | Date |
| --- | --- | --- |
| 168,523 | Oppenheimer | Oct. 5, 1875 |
| 1,261,143 | McWilliams | Apr. 2, 1918 |
| 1,383,032 | Scranton | June 28, 1921 |
| 1,941,860 | Hanson | Jan. 2, 1934 |
| 2,418,717 | Machado | Apr. 8, 1947 |
| 2,419,680 | Flynn | Apr. 29, 1947 |